United States Patent Office 3,026,459
Patented Mar. 20, 1962

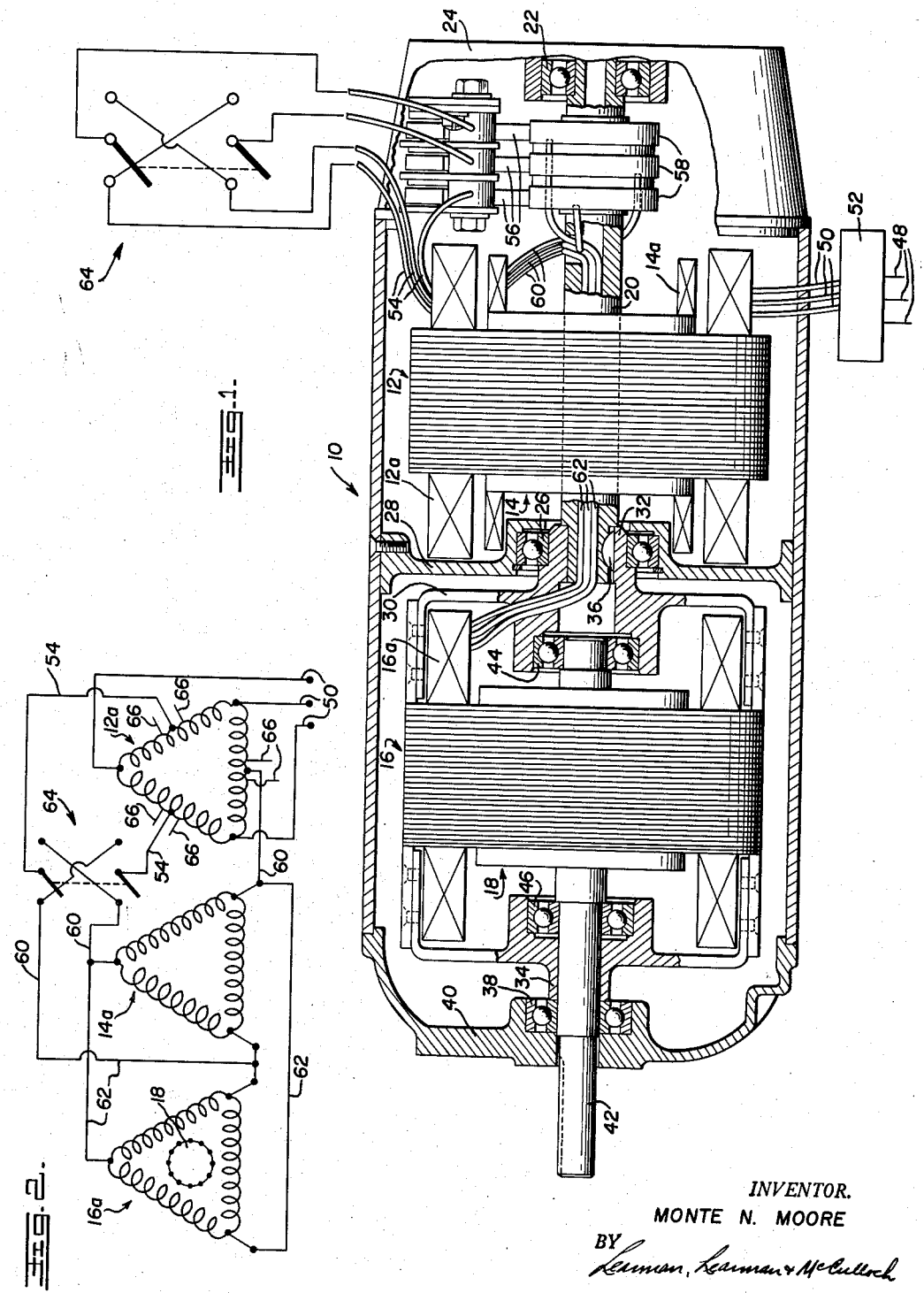

3,026,459
ELECTRIC MOTOR
Monte N. Moore, 2602 Leith St., Flint, Mich.
Filed Feb. 13, 1959, Ser. No. 793,150
18 Claims. (Cl. 318—172)

This invention relates to an electric motor, and more particularly to an induction motor capable of instant start and stop without vibration and without heavy current drain or overheating.

In order to obtain substantially instantaneous start and stop of a motor output shaft, the prior art has resorted to complex clutching arrangements. It has been very difficult to make electric motors per se start and stop instantaneously, and only in motors of very small size has it been possible to overcome the inertia of the rotor substantially instantaneously without excessive current drain and overheating.

In the motor of the invention the output shaft may be started and stopped instantaneously even though the motor is a comparatively large polyphase type. Such operation may be carried out repetitively without problems of high current drain, overheating, or vibration. It is accordingly a principal object of the invention to provide such a motor.

Another object of the invention is to provide a motor of the foregoing type which is relatively simple in its construction.

A further object of the invention is to provide an induction type motor which is capable of being driven at a plurality of speeds and start under load without a high starting current.

A further object of the invention is to provide a motor of the foregoing type in which the power factor may be adjusted.

Still another object of the invention is to provide a motor of the foregoing type in which the torque at the output shaft may be adjusted.

A still further object of the invention is to provide a motor of the foregoing type which employs components of conventional types.

The foregoing and other objects, features, and advantages of the invention and the manner in which the same are accomplished will become more readily apparent upon consideration of the following detailed description of the invention taken in conjunction with the accompanying drawings, which illustrate a preferred and exemplary embodiment, and wherein:

FIGURE 1 is a longitudinal sectional view of the motor of the invention; and

FIGURE 2 is a schematic diagram illustrating a preferred manner of connecting the winding of the motor.

Briefly stated, the invention comprises an alternating current electric motor having a stator and a plurality of rotors (rotating fields and armatures). The winding groups of the stator and certain rotors are interconnected and certain rotors are mechanically and electrically phase displaced to provide electrical interaction and high reactance such that the output shaft of the motor may be started, stopped, and reversed instantaneously without high inrush of current and consequent overheating. Certain components of the motor are coupled magnetically and electrically, others are coupled electrically and mechanically, and others are coupled only mechanically. The inventive concepts which provide the unique results obtainable by the invention reside in the foregoing relationships and in others to be described.

Referring to FIGURE 1 of the drawings, the motor of the invention may comprise a single housing 10 which contains the following components: a control stator 12 fixed to the housing 10, a first control rotor 14 concentric with stator 12 and magnetically coupled thereto, a second stator rotor 16 adjacent rotor 14 but magnetically separate therefrom, and a third multi-frequency output rotor 18 concentric with rotor 16 and magnetically coupled thereto. Stator 12 has a winding 12a, rotor 14 a winding 14a, and rotor 16 a winding 16a. Rotor 18 is preferably of the squirrel cage type.

Rotor 14 is mounted on a shaft 20 which is supported in the housing 10 by a bearing 22 mounted on the end bell 24 and by a bearing 26 mounted on a divider plate 28 fixed transversely within the housing. Rotor 16 is supported on a frame 30 having a pair of opposed stub shafts 32 and 34. Shaft 32 is keyed to shaft 20 as indicated at 36, and shaft 34 is supported on a bearing 38 attached to the end bell 40. Rotor 18 is mounted on the output shaft 42, which is supported in the frame 30 by bearings 44 and 46.

Winding 12a of the stator is connected to power supply lines 48 by conductors 50. Three phase lines are shown in this exemplary form. Conventional main line disconnect and reversing switches are interposed between conductors 48 and 50 for the usual wye-delta method of starting the motor as indicated by the block 52. The disconnect switch may be a 3 pole single throw switch and the reversing switch may be a double pole double throw switch arranged to interchange the connections between two of the conductors 50 and corresponding conductors 48.

Connections between winding 12a and the other windings of the motor are made by conductors 54, brushes 56, slip rings 58, and conductors 60 and 62. The brushes 56 are supported in the end bell 24, while the slip rings 58 are mounted on the shaft 20, which is hollow so as to accommodate the conductors 62. Transverse openings in the hollow shaft and the frame 30 permit passage of conductors 60 and 62. A double pole double throw switch 64 is interposed in two of the conductors 54 and is arranged to reverse the connections between these conductors and corresponding brushes.

One manner in which the winding groups of the motor may be interconnected is illustrated in FIGURE 2. In this figure it is assumed that each winding has its coils connected in a delta arrangement, although a star or Y connection could be used. In the form shown, the conductors 50 are connected to the vertices of the delta winding 12a, and center taps of these coils are connected to the vertices of the coils of winding 14a. The vertices of this winding are connected to the vertices of the winding 16a. Additional taps 66 are provided on the coils of winding 12a to vary the energization of winding 14a. It has been found that the output torque at shaft 42 may be controlled in accordance with the positions of these taps. The windings may be separate groups interconnected to one another as shown or may be formed continuously and arranged on their respective supports in the manner described.

The coils of the respective windings are arranged to provide the desired number of magnetic poles, the exact number depending upon the speed desired. In the disclosed embodiment of the invention, the wound stator and rotors have the same number of poles, and the rotor 16 is keyed to the shaft of the rotor 14 in such manner that the magnetic poles of rotor 16 are phase displaced ±90 electrical degrees with respect to the poles of rotor 14 so that the resultant rotary magnetic field produced by rotor 16 is displaced ±90 electrical degrees with respect to the corresponding field of the rotor 14. The arrangement of the conductors 62 will affect the power factor of the motor, and an additive or subtractive relationship between the reactance of the rotors 14 and 16 may be obtained by interchanging a pair of the conductors 62.

The operation of the motor of the invention is as follows: When line switch 52 is closed, the stator 12 is energized, as well as the rotors 14 and 16. The rotary field produced by the stator winding causes rotation of the rotor 14 and the rotor 16 locked thereto. When the switch 64 is placed in one of its positions, rotor 18 and output shaft 42 revolve. However, when switch 64 is reversed, rotor 18 stops instantaneously. When this occurs, rotors 14 and 16 continue to rotate at the same speed as before. Throwing switch 64 back to its first position places the rotor 18 in motion instantaneously. If switch 64 is moved back and forth, the motor will start and stop repetitively without drawing high currents and without overheating or vibration.

Starting and stopping of the motor may be attributed to the addition or subtraction of the mechanical and electrical rotation of the field of stator 16 affecting rotor 18 effected through switch 64. The absence of vibration is believed due to the fact that the effective rotor inertia is small and centered on the output shaft. The space phase displacement between rotors 14 and 16 is believed to produce a reactance interaction which prevents high currents in starting, stopping, or reversing. The exemplary motor arrangement as specifically described has been placed in operation whereby performance has demonstrated the results attributed to the novel arrangement as hereinbefore indicated. These results may however be explained on a theoretical basis as an optional alternative to the practical demonstration which in itself is sufficient to establish the advantageous results referred to.

It will therefore be appreciated by those skilled in the art, that the polyphase alternating current conducted to the physically stationary winding 12a of the stator 12 produces a rotating magnetic field therein by virtue of the winding phase current variations in the phase belts of the stator winding. The magnetic field of the stator rotates therefore in a predetermined direction and at a synchronous speed. The winding 14a of rotor 14 when placed in the rotating magnetic field of the stator 12 induces an E.M.F. in the rotor winding, when the rotor rotates relative to the stator at a predtermined slip value. It is also known that the torque developed by the rotor is proportional to the product of the instantaneous magnetic flux density and the rotor winding current in the rotor winding conductors cutting the magnetic flux lines. Therefore, ordinarily when starting from standstill, the slip of rotor 14 is greatest so that the reactance of the rotor winding 14a is greatest causing the induced rotor winding current to lag the induced E.M.F. therein by approximately 45° while the mutual flux center is displaced approximately 90° in space phase position from the induced and counter E.M.F.'s in the windings of the rotor 14 and stator 12 respectively similar to the action in a static transformer. As a result thereof, some of the current winding phase belts of the rotor are disposed in a magnetic field reverse of that in which its phase belt is located during the time interval between which the flux density of the field becomes maximum, causing a reverse torque to be applied to such conductors tending to reduce the torque from that which would otherwise occur if the flux and current were in space phase relation. The average torque developed in the rotor is therefore equal to the product of the torque developed when the flux density of the stator field and the rotor current are in space phase and the cosine of the space lag angle, as is well known in the art. Accordingly, to start a loaded rotor, a large induced current in the rotor is required until its speed increases so as to reduce slip and rotor reactance. In the present case however, rotor 14 is only loaded by its connection to the stator 16 requiring a smaller torque for starting purposes and hence a smaller starting rotor winding current. Therefore, the winding phase belts of the stator winding 12a are selectively connected in directionally different phase sequences to the rotor winding phase belts by the winding taps as described to impress on the rotor winding 14a a control voltage to reduce in magnitude the E.M.F. induced in the rotor winding 14a and hence also the winding current of the rotor 14. The same control voltage is however also impressed on the stator winding 16a of stator 16 which would produce a rotating magnetic field in rotor 16 which is a function of both the control voltage and induce voltage developed in the rotor 14. However, since the stator winding 16a is angularly displaced in one direction with respect to the winding of rotor 14 by an amount depending on the number of magnetic poles of the winding (90° for two poles), the mutual flux center of winding 16a at start will approach an inphase relationship to the induced E.M.F. in rotor 18 unlike the 90° relationship hereinbefore mentioned with respect to rotor 14 and stator 12 at start. Accordingly, rotor 18 at starting speeds will have the benefit of a smaller space phase lag between the flux center and winding current to produce larger starting torques in the rotor 18 for a lower induced winding current thereof. Furthermore, since the stator 16 is rotated by rotor 14, the speed of the rotating field of stator 16 will be increased above synchronous speed if the winding thereof is in proper phase sequence to the winding taps on the stator 12. Thereby, the starting torques developed in the rotor 18 may be mechanically increased by the mechanical coupling between the stator 16 and the rotor 14 and further help reduce the starting winding current in the rotor 18 necessary to carry the load thereon. It will therefore be appreciated that by reversing the connection to the stator winding 16a through the reversing switch 64, the synchronous rotation of the stator field of rotor 16 may be directionally controlled to oppose the mechanical rotation of the stator 116. Accordingly, reversal of the stator winding connections would be effective to utilize the torque developed in the rotor 14 as either a supplementing torque for the rotor 18 or a braking torque. Also, as rotor 18 increases in speed, and its slip reduces in value, a reduction in torque developed therein from its more optimum starting arrangement will be offset by the increasing torque developed in the rotor 14, which conversely may be utilized as an increased braking torque necessary to brake the motor at higher speeds.

It will be further appreciated, that by varying the winding tap locations through which the rotors 14 and 16 are electrically connected to the winding of the stator 12, the polyphase load balance may be controlled in order to improve the power factor of the motor arrangement. Further, the winding tap control may also be utilized to vary the relative reactances of the respective windings and the control voltage impressed upon the stator 16 in order to change the speed and torque characteristics of the motor arrangement.

If it is desired to provide a plurality of output speeds, the coils of the winding groups may be arranged so as to provide a plurality of poles, the effective number of which may be selected by a suitable switching arrangement. Such winding and switching arrangements per se are well known in the art.

While a preferred embodiment of the invention has been shown and described, it will be apparent to those skilled in the art that changes can be made without departing from the principles and spirit of the invention, the scope of which is defined in the appended claims. Although the foregoing embodiment is a three phase motor, the principles of the invention may be applied to motors with a different number of phases. Within the broader aspects of the invention, the windings may be arranged so that certain windings provide a different number of poles from others. Accordingly, the foregoing embodiments is to be considered illustrative, rather than restrictive of the invention, and those modifications which come within the meaning and range of equivalency of the claims are to be included therein.

The invention claimed is:

1. An electric motor comprising a fixed winding, a first rotatable winding concentric with said fixed winding and magnetically coupled thereto, a second rotary winding adjacent the first rotary winding, said second rotary winding being mechanically coupled to said first rotary winding for rotation therewith but magnetically separate therefrom, a rotor concentric with said second rotary winding and magnetically coupled thereto, an output shaft coupled to said rotor, a power line interconnecting said stationary winding with a source of power, means connecting said stationary winding to said first and second rotary windings electrically, and means for interchanging the connections between said stationary winding and said rotary windings.

2. The invention of claim 1, said first and second rotary windings having magnetic poles establishing resultant rotary fields, the resultant field of the first and second rotary windings being phase displaced by approximately ±90 electrical degrees.

3. The invention of claim 1, wherein said power source is A.C. having a certain number of phases and said windings have corresponding phase coils.

4. The invention of claim 3, said interchanging means comprising switch means.

5. The invention of claim 3, the coils of said stationary winding having selectable taps thereon for varying the energization of said first rotary winding.

6. The invention of claim 3, the coils of the respective windings being connected in delta.

7. The invention of claim 3, the means connecting said stationary winding and said first rotary winding having one end thereof connected to the respective midpoints of the coils of said stationary winding.

8. The invention of claim 1, said connecting means comprising slip rings.

9. A dynamoelectric machine comprising a stator winding, a first rotor winding concentric with said stator winding, a second rotor winding adjacent the first rotor winding and mechanically connected thereto with its magnetic poles phase displaced from the poles of the first rotor winding, output rotor means concentrically mounted for rotation relative to said second rotor winding and electrical connecting means interconnecting said first and second rotor windings with winding taps on the stator winding and output rotor means coaxially mounted relative to said second rotor winding.

10. A polyphase induction motor comprising a single housing having therein a polyphase stator winding, a first polyphase rotor winding concentric therewith and magnetically coupled thereto, a second polyphase rotor winding adjacent the first rotor winding, said second rotor winding being magnetically separate from the first rotor winding, another rotor concentric with said second rotor winding and magnetically coupled thereto, an output shaft connected to said other rotor, conductors for connecting said stator winding to a polyphase power supply line, conductors connecting said stator winding to said first and second rotor windings, and means for changing the phase sequence of the connections between said windings, said second rotor winding having its magnetic poles displaced ±90 electrical degrees with respect to the magnetic poles of said first rotor winding.

11. An electric motor comprising a fixed winding, a first rotor concentric with said fixed winding and magnetically coupled thereto, a rotary winding adjacent the first rotor, said rotary winding being mechanically coupled to said first rotor for rotation therewith but magnetically separate therefrom, a second rotor concentric with said rotary winding and magnetically coupled thereto, and output shaft coupled to said second rotor, a power line for interconnecting said stationary winding and a source of power, winding tap means connecting said stationary winding to said first rotor and rotary winding electrically, and means for interchanging the connections between said windings.

12. An electric motor comprising a first rotary winding, a second rotary winding electrically connected to said first winding but magnetically separate therefrom, said windings being mechanically connected with their poles out of phase, means for rotating said first winding, and a rotary armature magnetically coupled to said second winding.

13. An electric motor comprising, control stator means, control rotor means magnetically coupled to the control stator means for developing a low starting torque that increases with a decrease in rotor slip, rotatable stator means operatively connected to the control rotor means in magnetically separate and out of phase relation for producing a rotary magnetic field therein for developing a high starting torque in an output rotor means magnetically coupled to the rotatable stator means and selective control means operatively connected to said control rotor means and rotatable stator means for rendering the torque developed in the control rotor means operative to either supplement or oppose the torque developed in the output rotor means.

14. The combination of claim 13, wherein said control means comprises electrical circuit means electrically connecting the stationary stator means to the control rotor means and rotatable stator means.

15. The combination of claim 14, wherein said electrical circuit means includes reversing switch means for changing electrical phase sequence combinations between the control stator means and the rotatable stator means.

16. The combination of claim 15 wherein said electrical circuit means further includes means for changing the relative reactances of the rotor and stator means.

17. The combination of claim 13, wherein said control means includes reversing switch means for changing electrical phase sequence connections between the control stator means and the rotatable stator means.

18. The combination of claim 13, wherein said control means includes means for changing the relative reactances of the rotor and stator means.

References Cited in the file of this patent

UNITED STATES PATENTS

| 912,144 | Mavor | Feb. 9, 1909 |
| 2,061,983 | Rossman | Nov. 24, 1936 |
| 2,309,904 | Hunsdorf | Feb. 2, 1943 |
| 2,896,143 | Bekey | July 21, 1959 |